(12) United States Patent
Ayanji et al.

(10) Patent No.: US 8,943,906 B2
(45) Date of Patent: Feb. 3, 2015

(54) SOLENOID FORCE MEASUREMENT SYSTEM AND METHOD

(71) Applicant: Caterpillar Inc., Peoria, IL (US)

(72) Inventors: Sudhindra K. Ayanji, Edwards, IL (US); Greg Weyeneth, Dunlap, IL (US); Jay Venkataraghavan, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 278 days.

(21) Appl. No.: 13/662,684

(22) Filed: Oct. 29, 2012

(65) Prior Publication Data

US 2013/0160570 A1 Jun. 27, 2013

Related U.S. Application Data

(60) Provisional application No. 61/579,149, filed on Dec. 22, 2011.

(51) Int. Cl.
 *G01L 1/00* (2006.01)
 *G01L 1/26* (2006.01)
(52) U.S. Cl.
 USPC .............. 73/862.381; 73/862.392; 73/862.68
(58) Field of Classification Search
 USPC .......... 73/862.381, 862.68, 862.392
 See application file for complete search history.

(56) References Cited

U.S. PATENT DOCUMENTS

| | | | |
|---|---|---|---|
| 4,738,552 A | 4/1988 | Kikuchi et al. | |
| 5,027,846 A | 7/1991 | Baron | |
| 5,896,076 A | 4/1999 | Van Namen | |
| 6,631,633 B1 | 10/2003 | Garg et al. | |
| 6,796,543 B2 | 9/2004 | Haeberer et al. | |
| 8,463,566 B2 * | 6/2013 | Kurmaniak et al. | ............ 702/64 |
| 2004/0026540 A1* | 2/2004 | Haeberer et al. | ........... 239/585.1 |
| 2006/0171091 A1 | 8/2006 | Seale et al. | |
| 2007/0081263 A1 | 4/2007 | Moon et al. | |
| 2010/0198538 A1 | 8/2010 | Kurmaniak et al. | |

OTHER PUBLICATIONS

"Shim Screws", document downloaded from the Conservation Technology website at <http://www.conservationtechnology.com/building_shimscrews.html>, Apr. 13, 2011.

"Edge Guide for Luthier Inlay/Binding" document downloaded from the Luthier Tools website at <http://www.luthiertools.co.uk/edgeguideinfo.html>, Apr. 13, 2011.

* cited by examiner

*Primary Examiner* — Lisa Caputo
*Assistant Examiner* — Jonathan Dunlap
(74) *Attorney, Agent, or Firm* — Joseph E. Reed

(57) ABSTRACT

A solenoid force measurement system includes: a first plate having an opening for receiving a solenoid; a second plate separated from the first plate by an air-gap; a force detection unit located within the second plate for measuring a force exerted by the solenoid; a height control device coupled to the second plate the height control device configured to adjust the size of the air-gap.

20 Claims, 5 Drawing Sheets

SOLENOID FORCE MEASUREMENT SYSTEM AND METHOD

CLAIM FOR PRIORITY

The present application claims priority from U.S. Provisional Application Ser. No. 61/579,149, filed Dec. 22, 2011, which is fully incorporated herein.

TECHNICAL FIELD

Embodiments of the present disclosure pertain to a solenoid force measurement system and method thereof.

BACKGROUND

Solenoids consist of an electromagnetically inductive coil, wound around a movable armature. The coil is shaped such that the armature can be moved in and out of a center, altering the coil's inductance and thereby becoming an electromagnet. The force applied to the armature moves the armature in a direction that increases the coil's inductance, and a spring element within the solenoid resists the force generated by the magnetic field, and biases the push rod towards its original position.

Solenoids may be controlled directly by a circuit, and may have very low reaction times. Solenoids are used in many applications. For instance, a solenoid armature may be used to provide a mechanical force to some mechanism, such as controlling a pneumatic valve. Additionally, solenoid valves may be used to control the flow of various fluids.

A conventional solenoid force measurement system relies on fixed air-gaps. Adjusting the size of the air-gap adjusts the amount of magnetic flux detected during the solenoid operation and thus the air-gap must be precisely calibrated during a force measurement. To adjust the size of the air-gaps in a convention solenoid force measurement system, spacers (e.g., metal shims) are added between an upper and lower plate of the conventional solenoid force measurement system.

However, setting an air-gap with spacers is a time consuming and inaccurate procedure. Erroneous measurements are common in the conventional system, because the parallelism and flatness of the spacers often cannot be set to within high precision tolerance levels (e.g., +/−5 microns).

SUMMARY

According to aspects disclosed herein, a system is provided for measuring solenoid force.

According to an aspect of an embodiment herein, a solenoid force measurement system is disclosed. The solenoid force measurement system including: a first plate having an opening for receiving a solenoid; a second plate separated from the first plate by an air-gap; a force detection unit located within the second plate for measuring a force exerted by the solenoid; a height control device coupled to the second plate, the height control device configured to adjust the size of the air-gap.

According to an aspect of another embodiment herein, a solenoid force measurement system is disclosed including: a first plate having an opening for receiving a solenoid; a second plate separated from the first plate by an air-gap, the second plate having a threaded through-hole; a force detection unit located within the second plate for measuring a force exerted by the solenoid; a height control device coupled to the second plate through a through-hole; a contact point coupled to the height control device, a top-side of the contact point coupled to a bottom-side of the first plate, the contact point configured to adjust the size of the air-gap in accordance to an adjustment of the height control device; and a spring-loaded bolt system for exerting positive contact force between the height control device and the first plate, wherein the height control device comprises four fine-thread screws and the contact point comprises four lifter balls, wherein each of the four fine-thread screws is coupled to a respective one of the four lifter balls through a respective through-hole within the second plate, wherein the four fine-thread screws are each radially equidistant from the center of the first plate and the four fine-thread screws are equally spaced, approximately 90 degrees from the respective adjacent ones of the four fine-thread screws, and wherein the spring-loaded bolt system comprises four spring-loaded bolts, and wherein each of the four spring-loaded bolts are each radially equidistant from the center of the first plate and are equally spaced, approximately 90 degrees from the respective adjacent ones of the four spring-loaded bolts.

DETAILED DESCRIPTION

Exemplary embodiments of the present invention are presented herein with reference to the accompanying drawings. Herein, like numerals designate like parts throughout.

Figure 1:
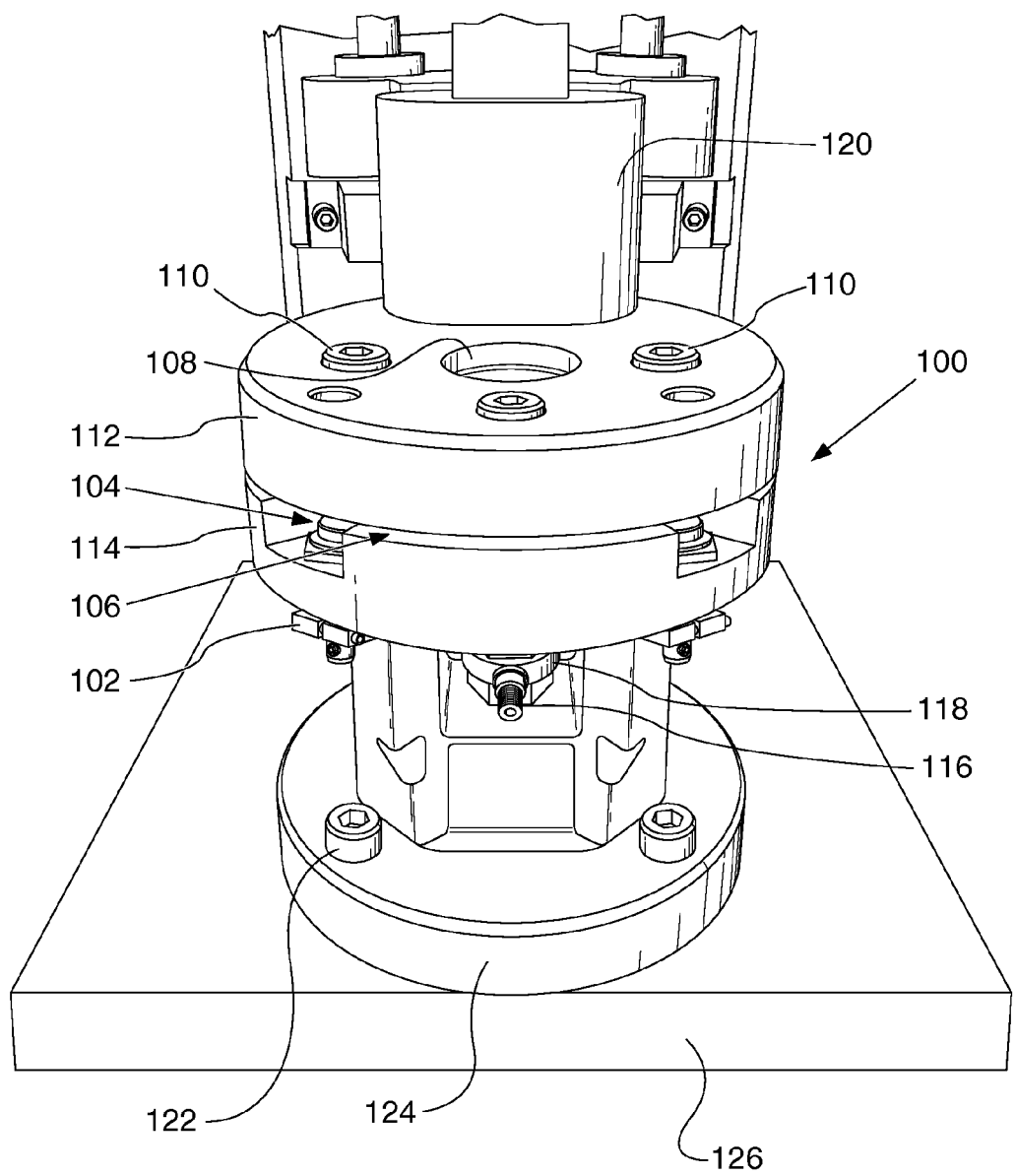
FIG. 1 illustrates an exemplary machine according to a embodiment described herein.
Figure 2:
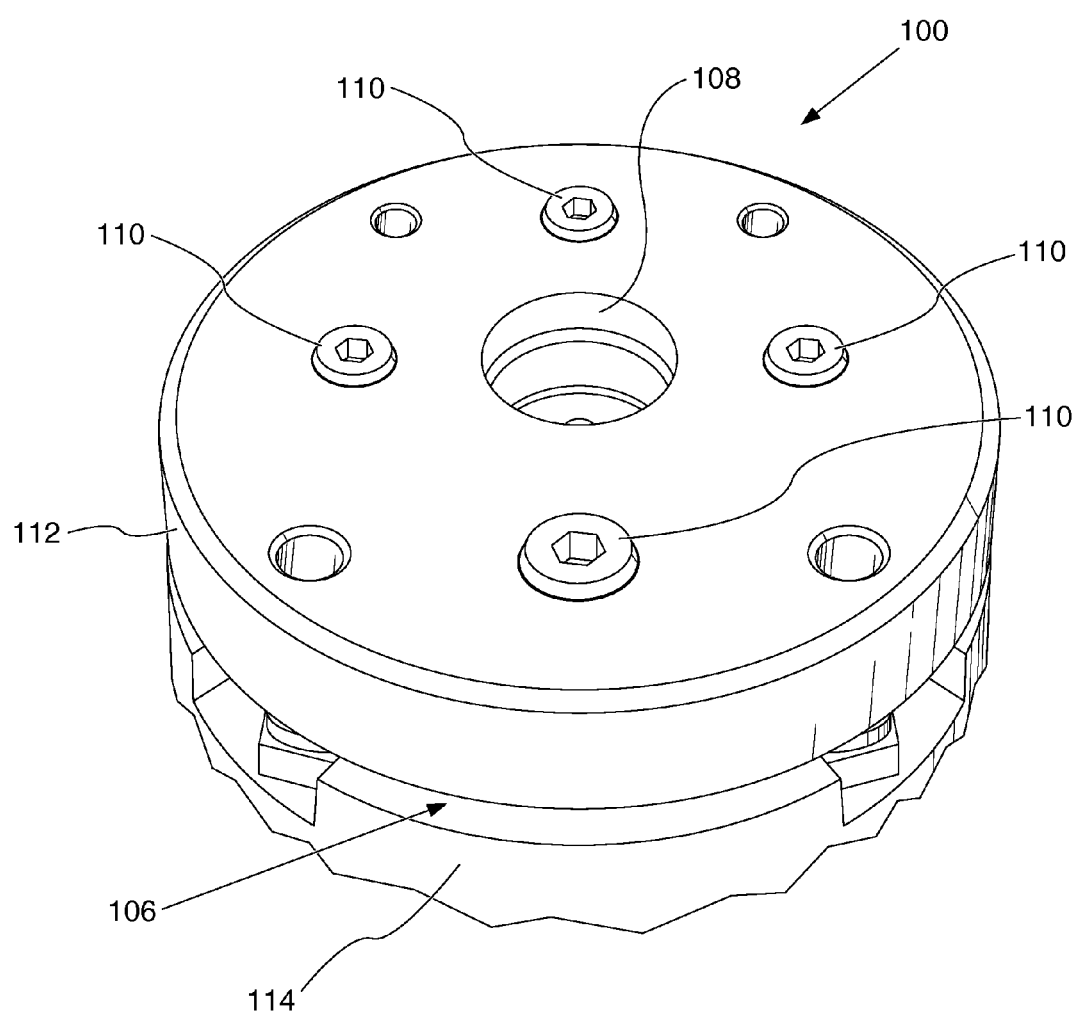
FIG. 2 illustrates a top view of a portion of the machine illustrated in FIG. 1.
Figure 3:
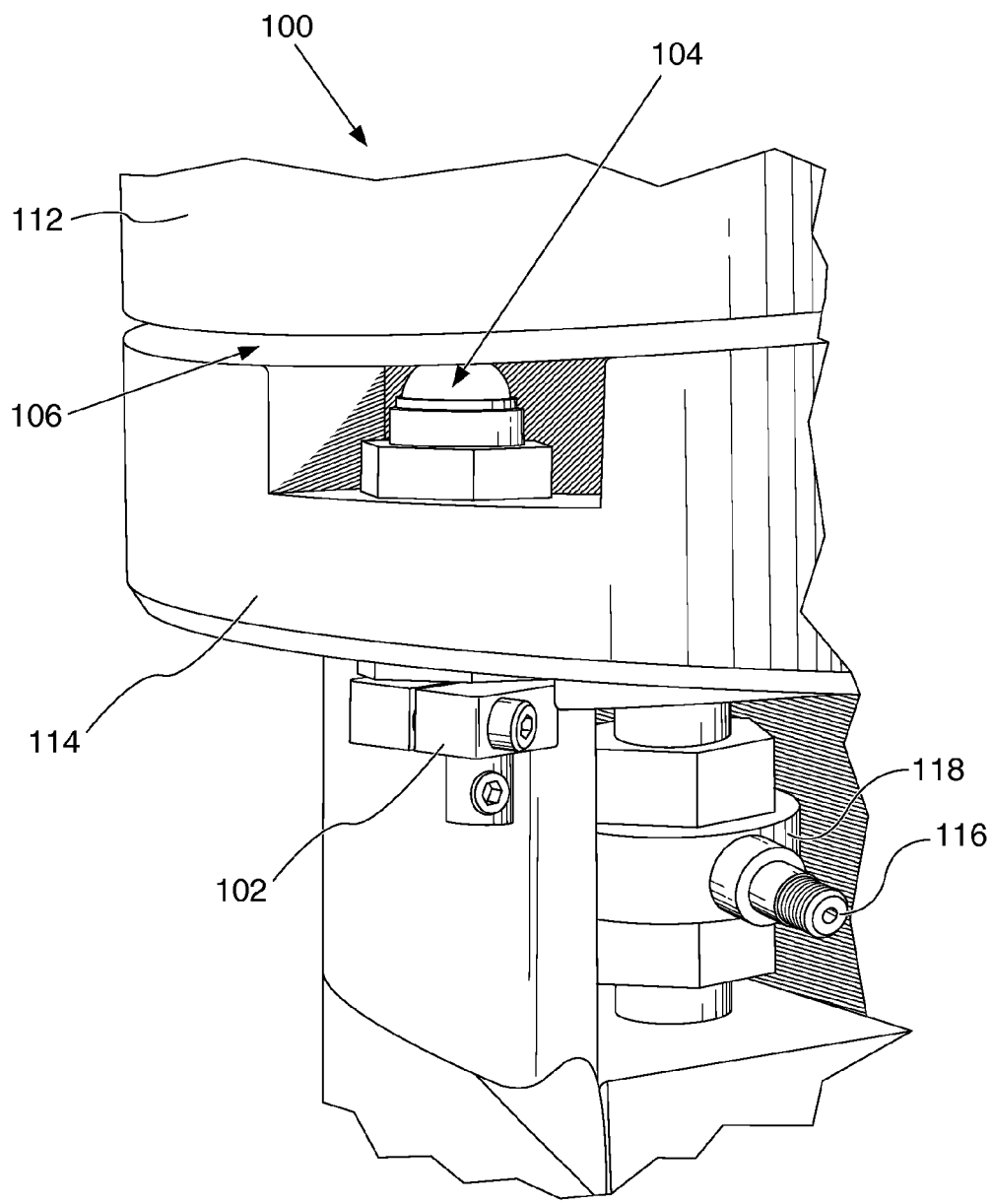
FIG. 3 illustrates an exploded view of a portion of the machine illustrated in FIG. 1.
Figure 4:
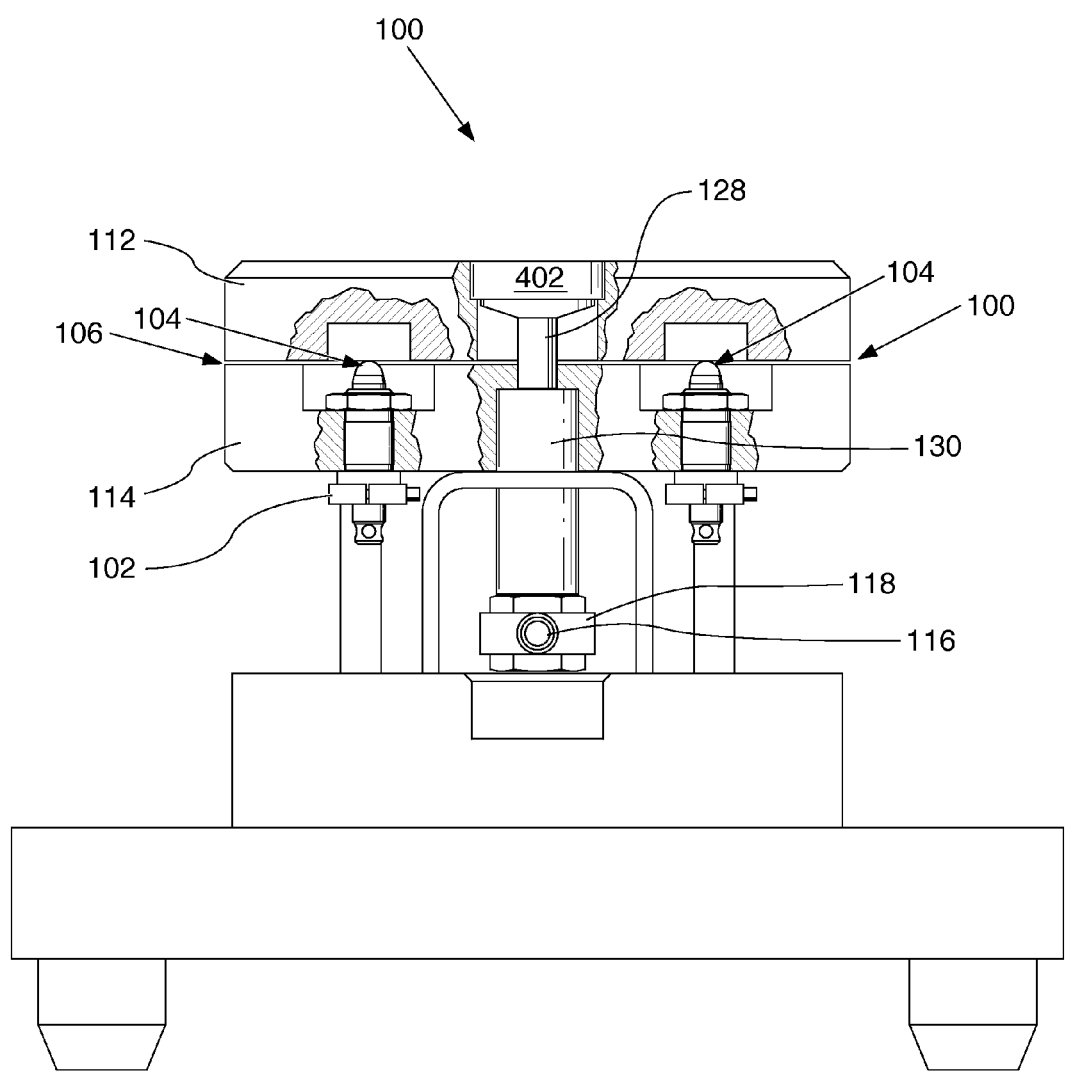
FIG. 4 illustrates a cut-away side view of the machine illustrated in FIG. 1.

FIGS. 1-4 illustrate various views of a solenoid force measurement system 100 according to an embodiment described herein. FIG. 2 illustrates a top view, FIG. 3 illustrates an exploded view, and FIG. 4 illustrates a cut-away side view of a solenoid force measurement system 100, as illustrated in FIG. 1.

According to FIGS. 1-4, a solenoid force measurement system 100 (also referred to as a force measurement system 100) includes: a first plate 112 (e.g., a lift plate 112), a second plate 114 (e.g., a base plate 114) separated from the first plate by an air-gap 106, a contact point (e.g., a lifter ball 104) coupled to the first plate 112 and the second plate 114, a height control device 102 (e.g., a thumbscrew 102 or a piezo actuator), a transducer 118 configured to measure the force of a solenoid 402, an electrical connector 116 configured to transmit a force reading from the transducer 118; and an armature and pin assembly 128. The force measurement system also includes a chamber 120 configured to hold the solenoid 402, a base 124, a frame 126, and a bolt 122 (or plurality of bolts 122) configured to securely attach the base 124 to the frame 126. The force measurement system 100 may also include an adapter 130.

The height control device 102 depicted in FIGS. 1-4 illustrates a thumbscrew 102, however the embodiments herein are not limited thereto. For instance, a piezo actuator or a piezo positioning device, may be used to control the height of the air-gap 106.

The first plate 112 is configured with an opening 108 (e.g., through-hole 108) for receiving a solenoid to be measured. The solenoid 402 to be measured may be held within the chamber 120, and may descend into the opening 108. Additionally, the lift plate 112 may be held in place with a spring and bolt 110 to exert positive contact force between the screws 102 and the lift plate 112.

The contact point 104 is coupled to the height control device 102, through a threaded hole in the second plate 114, such that adjusting the height control device 102 will adjust the height of the contact point 104. As the height of the contact point 104 increases, the contact point 104 is configured to extend above the second plate 114 and thereby increase the air-gap between the first plate 112 and the second plate 114.

A solenoid force measurement system 101 as illustrated in FIGS. 1-4 includes a lifter ball 104 that is coupled to a thumbscrew 102. In accordance to the direction the thumbscrew 102 is wound, the lifter ball 104 will be raised or lowered. As the first plate 112 contacts the lifter ball 104, the first plate 112 will thereby also raise or lower in accordance with the movement of the thumbscrew 102 and lifter ball 104.

Furthermore, a plurality of thumbscrews 102 may each be coupled to a respective lifter ball 104. According to an embodiment herein, four thumbscrews may each be coupled to a respective lifter ball 104. The four screws 102 may be oriented to give four different planar adjustment settings. The four screws 102 may be located radially-equidistance from the center of the first plate 112, and evenly spaced (e.g., 90 degrees offset) from each other.

According to an embodiment herein, a plurality of spring and bolt combinations 110 (e.g., spring-loaded bolts 110) may be used to more evenly distribute the positive contact force. According to one embodiment, four spring and bolt combinations 110 may be used. The four spring and bolt combinations 110 may be located radially-equidistance from the center of the first plate 112, and evenly spaced (e.g., 90 degrees offset) from each other. Each of the four spring and bolt combinations 110 may be spaced between two adjacent screws 102 as illustrated in FIG. 1.

The transducer 118 is configured to measure the force of the solenoid 402 on the armature and pin assembly 128, through the adapter 130. The adapter 130 is configured to transmit the force received by the armature and pin assembly 128 to the transducer 118. The adapter may be shaped according to the armature and pin assembly 128. The shape and composition of the armature and pin assembly 128 may be configured according to the solenoid 402 which is to be tested. In this manner the solenoid force measurement system 100 may be configured to accommodate various solenoids 402, without the need to change the transducer 118 or the plates 112, 114. Using customizable adapters 130 and armature and pin assemblies 128 may allow for quickly adapting the solenoid force measurement system 100 for use with various solenoids 402.

Figure 5:
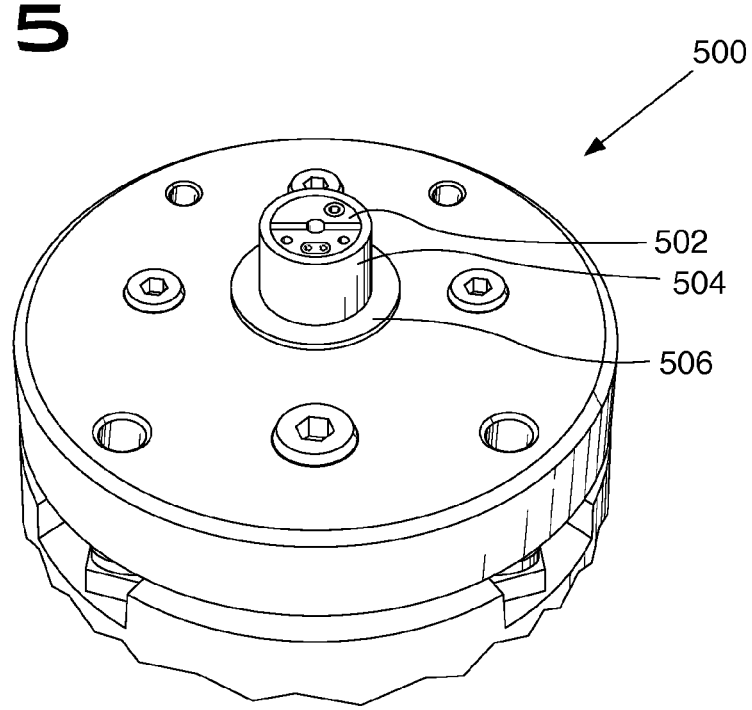
FIG. 5 illustrates a top view of an exemplary machine according to an embodiment herein.
Figure 6:
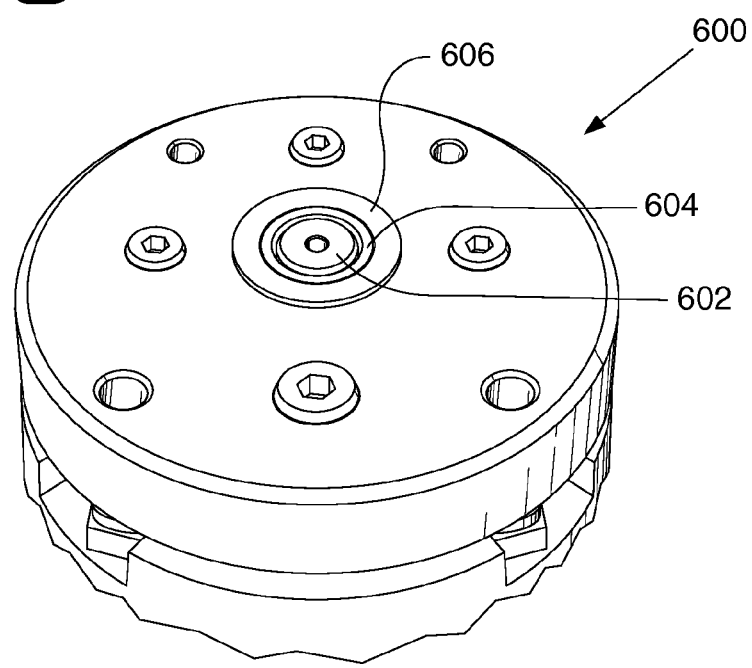
FIG. 6 illustrates a top view of an exemplary machine according to an embodiment herein.

FIGS. 5-6 illustrate top views of exemplary machines according to an embodiment herein. A force measurement system 500 or 600 may also include the features and elements as illustrated in FIGS. 1-4 and described above in addition to those denoted on FIGS. 5-6.

According to an embodiment illustrated in FIG. 5, a solenoid 502 is shown in a descended position. The force measurement system 500 may also include an adapter sleeve 504 and an adapter ring 506. The adapter sleeve 504 is configured to encompass the solenoid 502. The adapter sleeve 504 may be an interchangeable sleeve to accommodate various solenoids 502. The thickness of the sleeve 504 can vary in accordance with the solenoid 502 to allow the force measurement system 500 to receive various sized solenoids 502. Additionally, different sleeves 504 may be composed of different material (e.g., metal or metal alloys) to test the affect of the differing compositions on the force exerted by the solenoid 502 (e.g., to simulate different body material of the solenoid 502). In this manner, the affect of different material compositions which the solenoid 502 could be comprised of, can be simulated without the need to manufacture a multitude of various solenoids 502. The adapter ring 506 can be configured to accommodate various adapter sleeves 504 and/or solenoids 502.

A force measurement system 500 may also include the features and elements as described in FIGS. 1-4, but are omitted here for brevity.

According to an embodiment illustrated in FIG. 6, an armature 602 is shown in an ascended position. The force measurement system 600 may also include an adapter ring 606 and an air-gap spacer 604. The adapter ring 606 is configured to accommodate various adapter sleeves (e.g., an adapter sleeves 504 as shown in FIG. 5) and/or solenoids (not shown). The armatures 602 can be configured and sized as needed to accommodate various sized solenoids (not shown). The air-gap spacer 604 can be configured and sized as needed to accommodate various sized armatures.

Industrial Applicability

A solenoid force measurement system 100 may be implemented as shown in the figures e.g., FIGS. 1-4. In order to measure the force of the solenoid 402, housed within the chamber 120, the solenoid 402 descends into the first plate 112. Additionally, the air-gap 106 must be properly and precisely aligned for an accurate measure by the transducer 118.

In order to accommodate fine adjustment of the air-gap 106 between the first plate 112 and the second plate 114, the thumbscrew 102 may be a fine adjustment screw for adjusting the first plate 112 upward and downward. The thread of the screw 102 may be selected in accordance with the degree of precision required in adjusting the air-gap 106. For example, a $\frac{1}{64}^{th}$ mm thread fine adjustment screw 102 may be used and may achieve a high degree of precision adjustment (at least within +/−5 microns). Other finely threaded screws may also be used in place of a $\frac{1}{64}^{th}$ mm threaded screw 102.

The use of multiple screws 102 may increase the amount of control over the parallelism and flatness of the first plate 112 relative to the solenoid 402.

For example, the use of four equally-spaced $\frac{1}{64}^{th}$ mm thread fine adjustment screws 102, also orientation of the first plate 112 with four different planar adjustment settings, may offer heightened control over the parallelism and flatness of the first plate 112 relative to the solenoid 402.

Furthermore, a solenoid force measurement system 100 as disclosed herein may greatly decrease the amount of time required to test a solenoid's force relative to a conventional measurement system.

Although certain embodiments have been illustrated and described herein for purposes of description, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is intended that embodiments in accordance with the present invention be limited only by the claims and the equivalents thereof.

What is claimed is:

1. A solenoid force measurement system comprising:
   a first plate having an opening for receiving a solenoid;
   a second plate separated from the first plate by an air-gap;
   a force detection unit located within the second plate for measuring a force exerted by the solenoid;
   a height control device coupled to the second plate, the height control device configured to adjust the size of the air-gap.

2. A solenoid force measurement system of claim 1, wherein the height control device comprises a piezo actuator.

3. A solenoid force measurement system of claim 1, further comprising a contact point coupled to the height control device, a top-side of the contact point coupled to a bottom-side of the first plate, the contact point configured to adjust the size of the air-gap in accordance to an adjustment of the height control device, and wherein the second plate includes a through-hole, the height control device is coupled to the second plate through the through-hole; and the height control device comprises a screw.

4. A solenoid force measurement system of claim 3, wherein the screw is a $\frac{1}{64}^{th}$ mm thread fine adjustment screw and the contact point comprises a lifter ball.

5. A solenoid force measurement system of claim 1, further comprising a contact point coupled to the height control device, a top-side of the contact point coupled to a bottom-side of the first plate, the contact point configured to adjust the size of the air-gap in accordance to an adjustment of the height control device, wherein the height control device comprises four fine-thread screws and the contact point comprises four lifter balls, wherein each of the four fine-thread screws is coupled to a respective one of the four lifter balls through a respective through-hole within the second plate.

6. A solenoid force measurement system of claim 5, wherein the four fine-thread screws are each radially equidistant from the center of the first plate and the four fine-thread screws are equally spaced, approximately 90 degrees from the respective adjacent ones of the four fine-thread screws.

7. A solenoid force measurement system of claim 5, wherein each of the four fine-thread screws is a $\frac{1}{64}^{th}$ mm thread fine adjustment screw.

8. A solenoid force measurement system of claim 1, further comprising a spring-loaded bolt system for exerting a positive contact force between the height control device and the first plate.

9. A solenoid force measurement system of claim 8, wherein the spring-loaded bolt system comprises four spring-loaded bolts, and wherein each of the four spring-loaded bolts are radially equidistant from the center of the first plate and are equally spaced, approximately 90 degrees from the respective adjacent ones of the four spring-loaded bolts.

10. A solenoid force measurement system of claim 1, further comprising:
    a transducer configured to measure the force generated by the solenoid;
    an armature and pin assembly configured to relay the force generated by the solenoid to the transducer;
    an electrical connector coupled to the transducer, the electrical connector configured to transmit the force measured by the transducer as an electrical signal.

11. A solenoid force measurement system of claim 10, further comprising an adapter coupled between the armature and pin assembly and the transducer, the adapter configured to relay the force generated by the solenoid from the armature and pin assembly to the transducer.

12. A solenoid force measurement system of claim 1, further comprising:
    the solenoid; and
    an adapter sleeve configured to encompass the solenoid.

13. A solenoid force measurement system of claim 12, wherein the thickness of the adapter sleeve is in accordance with the solenoid.

14. A solenoid force measurement system of claim 12, wherein the adapter sleeve is configured of a material other than that of the solenoid.

15. A solenoid force measurement system comprising:
    a first plate having an opening for receiving a solenoid;
    a second plate separated from the first plate by an air-gap, the second plate having a threaded through-hole;
    a force detection unit located within the second plate for measuring a force exerted by the solenoid;
    a height control device coupled to the second plate through a through-hole;
    a contact point coupled to the height control device, a top-side of the contact point coupled to a bottom-side of the first plate, the contact point configured to adjust the size of the air-gap in accordance to an adjustment of the height control device; and
    a spring-loaded bolt system for exerting positive contact force between the height control device and the first plate,
    wherein the height control device comprises four fine-thread screws and the contact point comprises four lifter balls, wherein each of the four fine-thread screws is coupled to a respective one of the four lifter balls through a respective through-hole within the second plate,
    wherein the four fine-thread screws are each radially equidistant from the center of the first plate and the four fine-thread screws are equally spaced, approximately 90 degrees from the respective adjacent ones of the four fine-thread screws, and
    wherein the spring-loaded bolt system comprises four spring-loaded bolts, and wherein each of the four spring-loaded bolts are each radially equidistant from the center of the first plate and are equally spaced, approximately 90 degrees from the respective adjacent ones of the four spring-loaded bolts.

16. A solenoid force measurement system of claim 15, further comprising:
    a transducer configured to measure the force generated by the solenoid;
    a armature and pin assembly configured to relay the force generated by the solenoid to the transducer;
    an electrical connector coupled to the transducer, the electrical connector configured to transmit the force measured by the transducer as an electrical signal.

17. A solenoid force measurement system of claim 16, further comprising an adapter coupled between the armature and pin assembly and the transducer, the adapter configured to relay the force generated by the solenoid from the armature and pin assembly to the transducer.

18. A solenoid force measurement system of claim 15, further comprising:
    the solenoid; and
    an adapter sleeve configured to encompass the solenoid.

19. A solenoid force measurement system of claim 18, wherein the thickness of the adapter sleeve is configured to receive the solenoid.

20. A solenoid force measurement system of claim 18, wherein the adapter sleeve is configured of a material other than that of the solenoid.

* * * * *